Feb. 15, 1927.
C. ANDREWS, JR
BEATER
Filed March 5, 1925
1,617,787
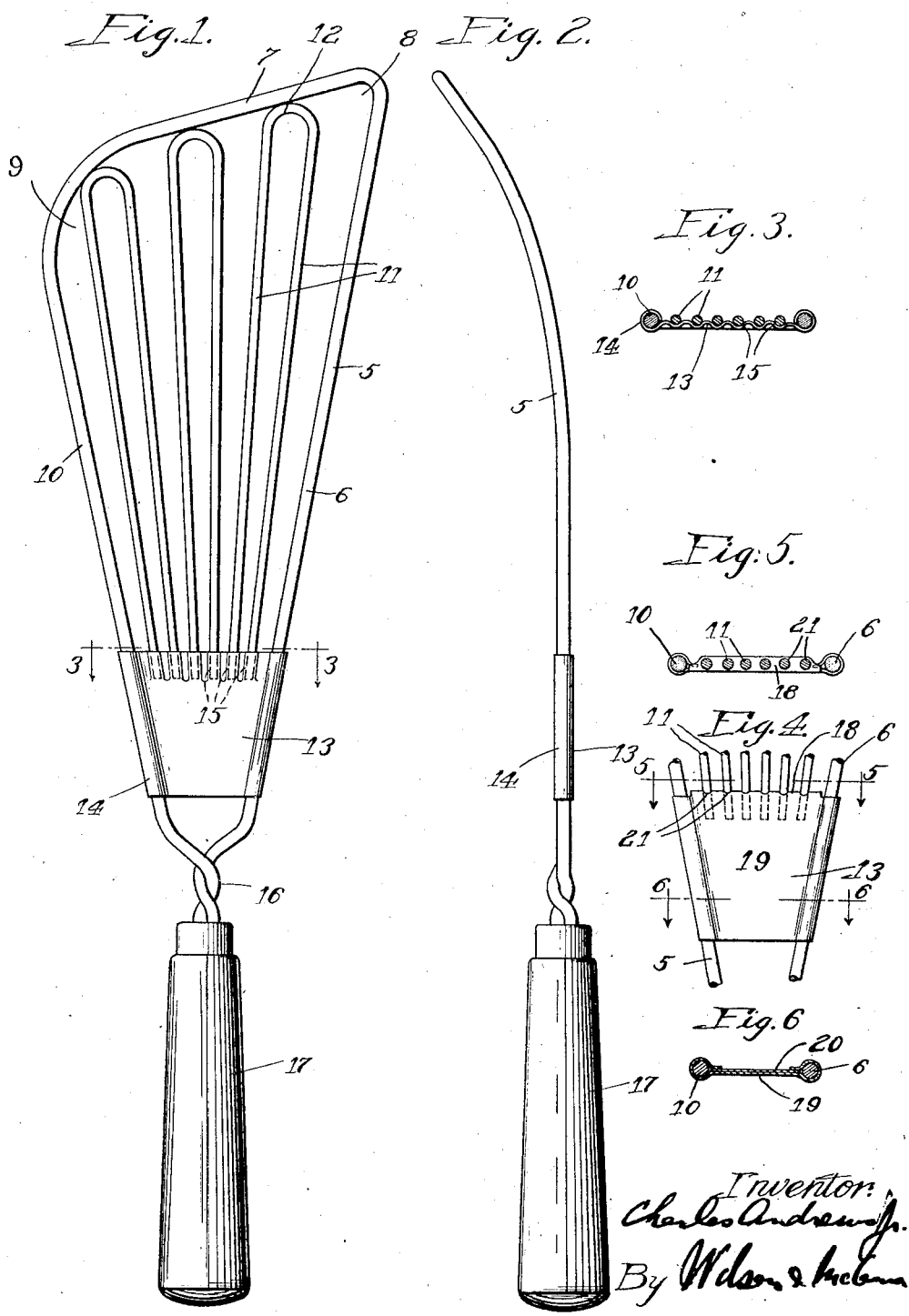
Inventor
Charles Andrews Jr.
By Wilson & McLean
Attys.

Patented Feb. 15, 1927.

1,617,787

UNITED STATES PATENT OFFICE.

CHARLES ANDREWS, JR., OF ROCKFORD, ILLINOIS, ASSIGNOR TO THE WASHBURN COMPANY, OF WORCESTER, MASSACHUSETTS, A CORPORATION OF MASSACHUSETTS.

BEATER.

Application filed March 5, 1925. Serial No. 13,014.

My invention relates to a beater or stirrer for culinary purposes, more particularly for beating eggs, whipping cream, mixing batter and like uses.

The invention provides a novel and simple implement by which any of the foregoing operations may be quickly and efficiently carried out, and which is so constructed as to produce maximum agitation or stirring with a minimum effort on the part of the user, and which is so constructed and shaped as to facilitate access to corners, edges or crevices in order to thoroughly loosen or pick up and disintegrate the material being acted upon, especially in mixing batter so that dry particles of flour or the like may be loosened and thoroughly intermixed with the flour content of the batter.

The invention also provides a stirrer which can be easily cleaned, the device being so designed as to obviate the necessity of twisting the wires or bending one upon the other thereby providing a flat implement without projecting rough edges and one which is durable and simple and capable of economical production.

Other objects and attendant advantages will be appreciated by those skilled in this art as the invention becomes better understood by reference to the following description when considered in connection with the accompanying drawing, in which—

Figure 1, is a plan view of a beater or stirrer constituting the subject matter of my invention in its preferred construction;

Fig. 2, is an edge view of the implement shown in Fig. 1 looking toward the left;

Fig. 3, is a cross-sectional view taken on the plane of the section line 3—3 of Fig. 1 and looking in the direction indicated by the arrows;

Fig. 4, is a fragmentary view of a modified form of connection between the inner beater wires and the frame; and Figs. 5 and 6, are cross-sections taken on the lines 5—5 and 6—6, respectively, of Fig. 4.

Referring to the drawings in detail in which like characters refer to the same parts throughout, and in which I have illustrated what I now consider to be the preferred embodiment of the invention, the stirrer or beater comprises a frame 5 preferably produced from a single length or strand of relatively stiff wire or other suitable material having a side 6 and an end 7 extending in acute angle relation with respect thereto at the corner portion 8. The end 7 is then curved as indicated at 9 and continued to form a side 10 which converges toward the side 6 opposite thereto. The curve 9 is adapted to fit within cooking utensils or receptacles with different curvatures so that the material being agitated or mixed may be easily scraped or removed from the surface thereof.

The corner portion 8 is relatively sharp and permits access to corners for removing or loosening material which may become collected therein, especially dry material such as flour, when the device is in use for mixing batter or the like. The combination of the rounded and sharp corners adapts the device for various shapes of receptacles in beating eggs, whipping cream, mixing batter or other stirring or agitating operations.

The frame 5 supports a plurality of longitudinally extended wires or tines 11, arranged in series and consisting preferably of short lengths of wire preferably smaller in cross section than the frame and rebent intermediately to form bight portions 12 which are welded, soldered or otherwise fastened at the inner periphery or side of the end 7 of the frame 5 as indicated more particularly in Fig. 1 of the drawings. The branching portions of these U-shaped members or wires 11, converge rearwardly or inwardly and diverge forwardly substantially like the sides 6 and 10 of the frame and have their rear ends anchored to a flat sheet metal clip or plate 13 at the inner end of the frame. This plate or section of sheet metal is substantially trapezoidal in shape and has its ends bent or clipped over the sides of the frame as indicated at 14 so that the edges are turned under and in contact with the bottom face of the plate proper, thus obviating exposed edges or corners which might be apt to injure the user by cutting or scratching. The forward edge of the sheet or flat metal clip 13 is crimped or corrugated as indicated at 15 to provide a series of recesses or seats in which the ends of the wires 11 are received and welded or soldered to firmly hold the same in position in connection with the anchoring of the forward portions at the end 7, thus providing a rigid substantial structure obviating the necessity of binding the wires one over the other which if resorted to produces a rough or bulky connection upon which the material collects and coagulates so that cleaning of such a device is accomplished with much difficulty. The extremities of the strand or sides 6 and 10 may be bent toward each other and joined or intertwisted as indicated at 16 to form a shank upon which a handle 17 of wood or other suitable material may be mounted. The device is easy to handle as compared with a wire or metal handle and the method of holding the wires in position and securing the same to the sheet metal clip by crimping and welding as described, facilitates cleaning.

Whether the device is used as an egg beater, cream whipper, batter mixer or for other purposes, the agitating and beating operation may be quickly carried out by reason of the plurality of wires. The construction insures that the various particles will be broken up and disintegrated especially when mixing batter and enables flour or the like to be loosened or removed from curved surfaces and corners of the receptacle irrespective of the shape so that it may be thoroughly mixed with the liquid content.

In Figs. 4 and 5 I have shown a modified form of connection between the tines or inner beater wires 11 and the sheet metal clip or plate 13, in which said plate is bent medially upon itself at 18 to provide a front 19 and a back 20, the side edges of the former being turned over the frame members 6 and 10 and clamped over the side edges of the back member 20, as shown in Fig. 6. Said plate is perforated at 21 along the bent edge to receive the ends of said wires. It will be noted that the front and back sides of the plate cover the wire ends so as to leave no sharp or projecting edges. With this construction it is not necessary to weld or otherwise secure the ends of the wires 11 to the plate 13.

While I have described what I consider to be the preferred embodiments of the invention it is to be understood that various changes in the details of construction and relation of parts described, may be resorted to without departing from the spirit and scope of the invention as will be hereinafter claimed. It is also understood that suitable, bendable or flexible material may be substituted for the wire although the latter is preferably used and is of round cross section. The metal parts of the implement are nickeled or otherwise coated to prevent rusting or contamination. It will also be observed that the body or frame of the beater is substantially triangular in outline, which shape facilitates the mixing action, while the longitudinal wires substantially form ribs or baffles adapted when moved through the material acted upon, to cause violent disturbance and agitation so that the mixing operation can be quickly and efficiently carried out.

I claim:

1. A beater comprising a frame having side wire members, a handle on one end of the frame, a sheet metal plate interposed between and secured to said side members adjacent to the handle, and beater wires secured to the frame and having ends secured to said plate.

2. A beater as set forth in claim 1 in which said ends are secured to said plate at spaced points along the edge of the plate remote from the handle.

3. A beater as set forth in claim 1 in which the end portion of said plate remote from the handle is perforated for the reception of said wires and is turned over against said ends to cover them.

4. A beater comprising a wire bordering frame providing an end portion and adjoining side portions, a handle for said frame opposite said end portion, a plurality of beater wires between said side portions extending lengthwise of said frame in the same general direction as said side portions, each pair of adjacent wires being formed from a continuous piece joined by a loop secured to the end portion of said frame, and a plate interposed between and secured to said side portions of said frame at the handle end thereof having said intermediate beater wires secured thereto.

CHARLES ANDREWS, Jr.